United States Patent [19]

Robinson

[11] Patent Number: 4,962,963

[45] Date of Patent: Oct. 16, 1990

[54] POWER LINEAR SEAT RECLINER

[75] Inventor: David L. Robinson, Sterling Heights, Mich.

[73] Assignee: Fisher Dynamics Corporation, St. Clair Shores, Mich.

[21] Appl. No.: 384,161

[22] Filed: Jul. 24, 1989

[51] Int. Cl.⁵ .......................... A47C 1/024; B60N 1/06
[52] U.S. Cl. ..................................... 297/361; 297/362
[58] Field of Search ......................... 297/361, 362, 330

[56] References Cited

U.S. PATENT DOCUMENTS

| 2,668,581 | 2/1954 | Luketa | 297/362 X |
| 4,304,386 | 12/1981 | Nagashima | 297/362 X |
| 4,366,983 | 1/1983 | Klueting et al. | 297/362 |
| 4,386,803 | 1/1983 | Gilderbloom | 297/330 X |
| 4,759,587 | 7/1988 | Bucka | 297/361 |

FOREIGN PATENT DOCUMENTS

| 3414514 | 10/1985 | Fed. Rep. of Germany | 297/362 |
| 3519055 | 12/1986 | Fed. Rep. of Germany | 297/362 |

Primary Examiner—Peter R. Brown
Attorney, Agent, or Firm—Harness, Dickey & Pierce

[57] ABSTRACT

A power linear seat recliner apparatus for controllably adjusting the angular position of a seat back relative to a seat cushion. The apparatus comprising a master recliner mechanism having an integrally mounted motor, a slave recliner mechanism and an actuator cable connecting the slave and master recliner mechanisms for transmitting torque from the motor to the slave recliner mechanism. The motor simultaneously drives each of the recliner mechanisms. The master and slave recliner mechanisms having a threaded rod assembly interconnected to a transmission assembly for providing desired speed reduction and linear reciprocable movement of the rod.

22 Claims, 7 Drawing Sheets

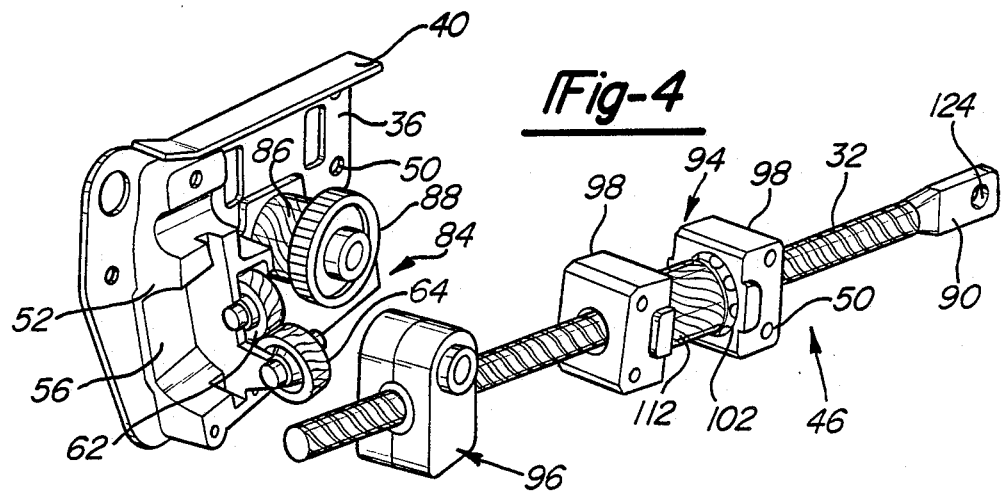
Fig-4
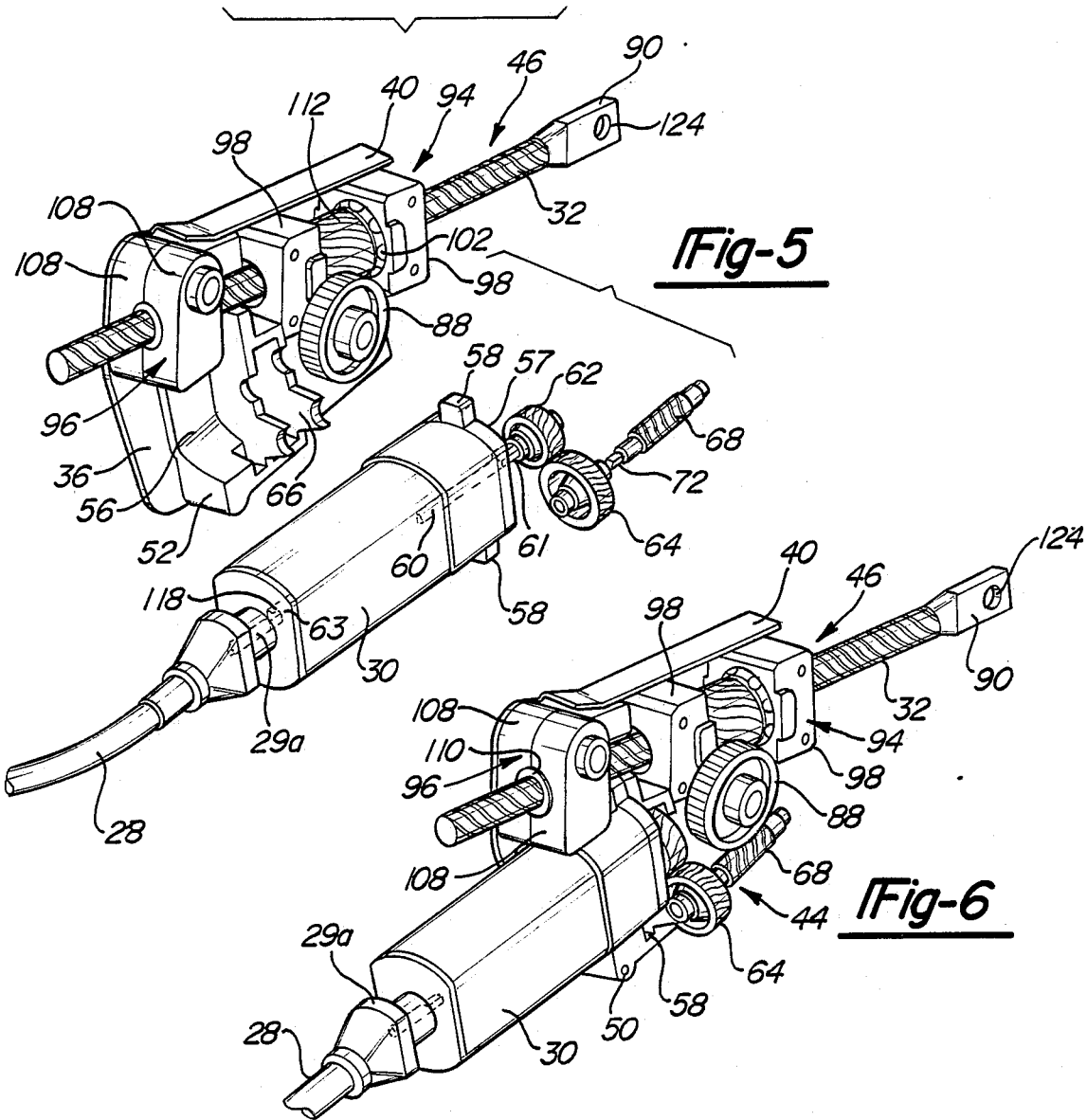
Fig-5
Fig-6

POWER LINEAR SEAT RECLINER

BACKGROUND AND SUMMARY OF THE INVENTION

The present invention relates to a linear seat recliner and, in particular, to a power linear seat recliner system for positioning and retaining a reclinable seat back of a vehicle seat in a desired angular position.

Conventional power linear seat recliner systems use a central motor which drives two actuator cables. The cables, in turn, plug into gear nuts which engage threaded shafts on opposite lateral sides of a seat. The threaded shafts, which reciprocate in a linear fashion, are secured to a pivotal mechanism which provides seat back reclining adjustment relative to the linear motion of the threaded shaft. However, such systems are unreliable in that the connection between the cables and the gear nuts are prone to premature failure and are generally noisy. Additionally, a larger motor is required because of the large torque and indirect speed reduction requirements. Further, conventional linear power seat systems are installed with the motor mounted directly under the seat cushion which necessitates a raised seat height, thereby reducing available headroom within the vehicle. Another disadvantage is that conventional power recliner systems cannot be assembled as a recliner subassembly for quality testing prior to installation into the seat structure.

It is therefore an object of this invention to provide a relatively simple design for a two-sided power linear seat recliner system which uses an integrally mounted motor to directly drive one side of the recliner system and motor driven actuation means for driving the opposite side of the system. The actuation means can include either a single cable or a torque tube provided to interconnect the two sides of the recliner system. The system components are assembled as a single unit before installation in a seat system. In fact, the present invention utilizes a large number of common and mirror imaged components within the opposing recliner mechanisms so as to substantially reduce costs while simplifying the assembly and operation thereof. Further, because of the similarity of structure between the master recliner mechanism and the slave recliner mechanism, the cable or the torque tube can be made of any desired length to permit use on seat systems having different widths.

Other advantages and features will become apparent from the following specification taken in connection with the accompanying drawings.

BRIEF DESCRIPTION OF THE DRAWINGS

FIGS. 4 through 6 are exploded perspective views of the master recliner mechanism showing the assembled orientation and functional interaction of the various components;

DETAILED DESCRIPTION OF THE PREFERRED EMBODIMENT

Figure 1:
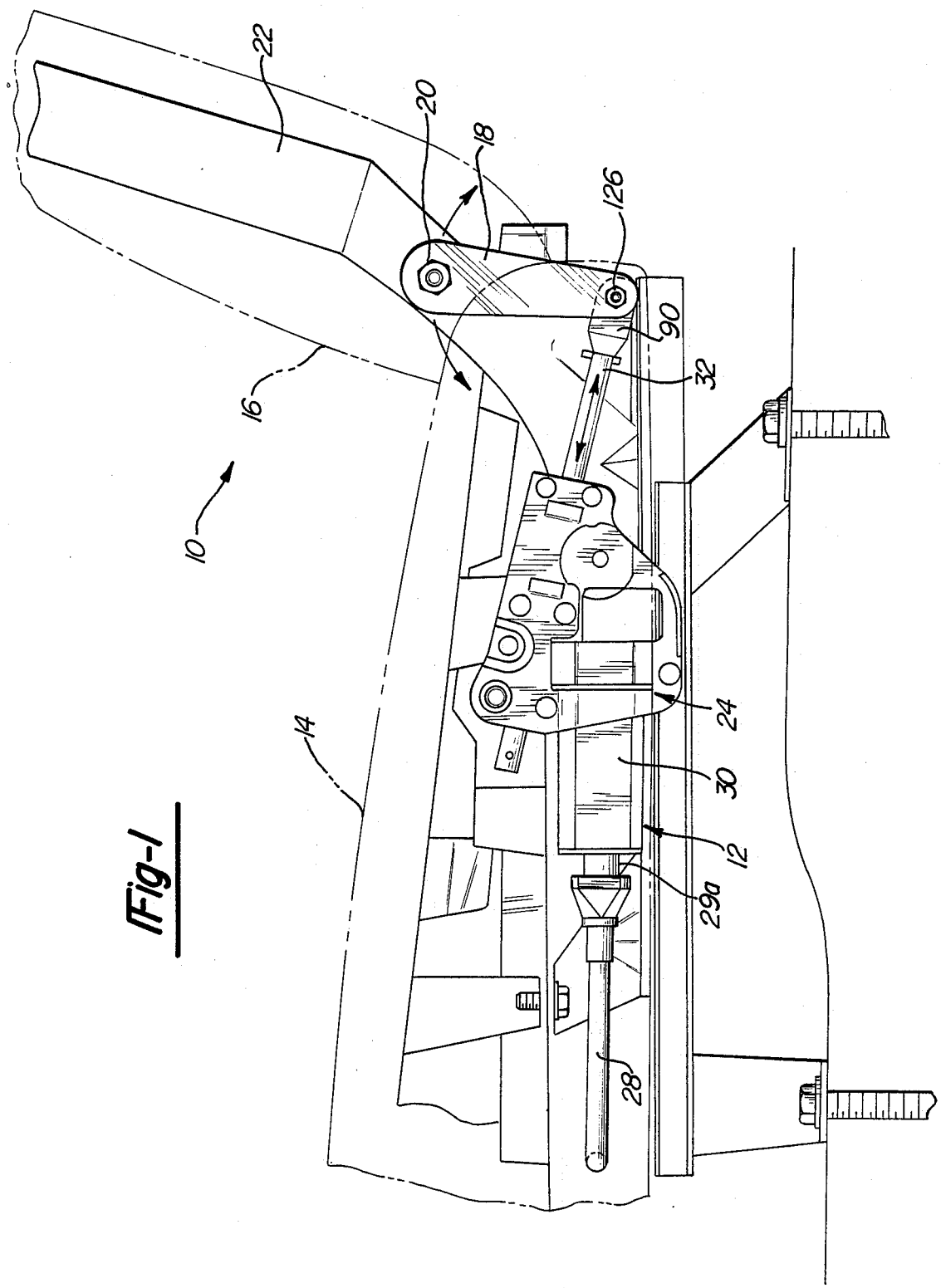
FIG. 1 is a side elevational view of a vehicle seat according to a first preferred embodiment of the instant invention, illustrating the operational association between the power linear seat recliner system and common seat structure support.

Referring now to the drawings, FIG. 1 shows, in schematic fashion, a vehicle seat assembly 10 incorporating a power linear seat tilt-adjusting system in accordance with the present invention. The seat assembly 10 is of the type conventionally installed in the front passenger compartment of a motor vehicle and comprises power linear recliner system 12, a seat cushion 14 and a seat back 16 functionally interconnected to permit the angle therebetween to be controllably varied. The seat back 16 is coupled for pivotal movement relative to the seat cushion 14 to a lower recliner structure 18 as by a fastener 20 so as to permit the seat back 16, supported on an upper recliner structure 22, to be pivoted to a desired reclining position. The upper and lower reclining structures, 18 and 22, respectively, are typically fabricated of metal plates suitably configured to provide stable pivotal motion and which are mirror images of one another at their opposite lateral sides.

The power linear recliner system 12 is provided for adjustably controlling reclining movement of the seat back 16 relative to the seat cushion 14. In accordance with the first preferred embodiment, the power linear recliner system 12 preferably includes a master recliner mechanism 24, a slave recliner mechanism 26, and an actuator cable 28 with an axially extending core 29 having opposite ends 29a and 29b connected for transferring torques from the master recliner mechanism 24 to the slave recliner mechanism 26. As will be hereinafter detailed, actuation of direct drive motor 30, integrally assembled into master recliner mechanism 24, produces simultaneous and substantially identical linear reciprocal motion of threaded rod 32 associated with master recliner mechanism 24 and threaded rod 34 associated with slave recliner mechanism 26. Actuation of the motor 30 is provided by a position control switch (not shown) provided within the passenger compartment and in close proximity to seat assembly 10 to permit the vehicle operator to selectively recline seat back 16 relative to seat cushion 14 in either direction through a range of angular positions.

Referring now to FIGS. 3 through 8, the functional association of the components assembled in master recliner mechanism 24 are illustrated. Master recliner mechanism 24 comprises a generally rectangular housing that includes a first side plate 36 and second side plate 38 each having a flange 40 and 42, respectively, upstanding therefrom, a motor 30, a transmission assembly 44, a rod assembly 46 and rivets 48. The plates 36 and 38, transmission assembly 44 and rod assembly 46 include an array of corresponding cylindrical apertures 50 sized to receive the rivets 48. Each rivet 48 passes through the apertures 50 to secure the plates 36 and 38, transmission assembly 44, rod assembly 46 and motor 30 firmly together as an assembly. Preferably, first and second side plates 36 and 38 are fabricated from a relatively thin gauge sheet metal, however, any suitable material could be readily adapted. Master recliner mechanism 24 is then secured to lateral support structure provided under seat assembly 10 in a semi-permanent fashion. Repair or replacement of either recliner mechanism or the cable can be easily performed.

Transmission assembly 44 is provided to change the rotational motion of axially extending drive cable 60 into linear reciprocating motion of rod 32. Drive cable 60 is removably coupled within motor 30 to a rotatable motor armature (not shown) for transferring the torque generated by motor 30 to the transmission assembly 44. The direction of linear motion of rod 32 is dependent on the direction of rotation of motor 30. Transmission assembly 44 comprises a first and second housing 52 and 54, respectively, each having a first and second face with the first faces being abutted so as to define a series of recesses which are configured to confine the components of transmission assembly 44 to be described. Preferably, transmission housings 52 and 54 are made from plastic, however any suitable material could be utilized. Specifically, first and second transmission housings, 52 and 54, are configured to define a first recess 56 sized to securely mount motor 30 therein. Motor 30 has a rearward most end 57 having vertically extending, oppositely oriented, flanges 58 to secure and align motor 30 within the similarly configured first recess 56. Extending axially from the rearward most end of motor 30 is a first end 61 of drive cable 60 which transfers the rotational motion generated by the torque of motor 30 to transmission assembly 44.

A pair of helical spur gears, 62 and 64, respectively, are provided and are maintained in meshing relationship in second recess 66 of transmission assembly 44. In particular, first end 61 of drive cable 60 is directly coupled to drive helical spur gear 62 and helical spur gear 64. Preferably, the helical spur gears 62 and 64 are not identical so that an initial speed reduction is provided. Preferably, the initial speed reduction provided is at least about 25% with a corresponding increase in torque. A worm gear 68 is secured to transmission housing 54 within a lower section of third recess 70. Worm gear 68 is axially aligned with, and coupled to rotate with helical spur gear 64. In this manner, the rotation of drive cable 60 is transferred to worm gear 68 via the rotation of helical spur gears 62 and 64. Worm gear 68 is coupled for rotation with helical spur gear 64 via drive shaft 72. Thrust plate 74, roller bearing 75, and thrust washers 76 are provided to inhibit excessive thrust forces while maintaining worm gear 68 within third recess 70. The remainder of third recess 70 is substantially circular in configuration and is provided with a central aperture 78. Aperture 78 extends through first side plate 36, first transmission housing 52, second transmission housing 54, and second side plate 38. Shaft 80 is axially aligned and secured for non-rotation within aperture 78 and is substantially enclosed within transmission assembly 44. Washers 82 are provided on opposite ends of shaft 80 to provide low friction bearing surfaces. Axially rotating on shaft 80 is a splined gear set 84 consisting of a helical spur gear 86 splined to helical spur gear 88. The orientation and positioning of the splined gear set 84 within transmission assembly 44 is such that helical spur gear 88 meshingly engages, and is driven by, worm gear 68. Helical spur gear 86 is interconnected with rod assembly 46 to drive threaded rod 32 in reciprocating linear motion to be described hereinafter.

Rod assembly 46 comprises an elongated threaded rod 32 having a first end defining a flat surface 90 and a retention pin 92 which prevents its forward withdrawal from master recliner mechanism 24 while providing a full rearward stop of seat back 16. Rod 32 is supported within master reclining mechanism 24 by helical gear nut 112 which is nested within bearing housing assembly 94 and a support housing assembly 96. Bearing housing assembly 94 includes a first and second bearing housings 98 each having an inner race surface 100 in which ball bearings 102 are disposed. Rod 32 axially moves through bearing housing assembly 94 and support housing 96 upon actuation of motor 30 to provide the desired linear motion. Both bearing housing assembly 94 and support housing assembly 96 are secured between inner side plate 36 and outer side plate 38 by rivets 48 extending through apertures 50. The second end 104 of threaded rod 32 extends through support housing assembly 96 and includes a retention pin 106 which prevents its rearward withdrawal from the master recliner mechanism 24 while providing a full forward stop of the seat back 16.

Support housing assembly 96 is comprised of first and second support members 108 defining a central bore in which a cylindrical polymeric sleeve bushing 110 is disposed. Threaded rod 32 extends through sleeve bushing 110. Provided between, and supported by, the ball bearings 102, within the bearing housing assembly 94, is helical gear nut 112 which is in meshing engagement with helical spur gear 86 of the splined gear set 84. Helical gear nut 112 is provided with an internal thread surface through which rod 32 is threadingly interconnected. Therefore, rotation of helical gear nut 112 produces linear movement of threaded rod 32. Specifically, remote actuation of motor 30 by the vehicle operator acts to generate rotation of drive cable 60 which, in turn, drives helical spur gears 62 and 64. Worm gear 68, driven by helical spur gear 64, drives helical spur gear 88 of spline gear set 84. Since helical gear 86 is splined to helical spur gear 88, it drives helical gear nut 112. The direction of rotation of drive cable 60 directly determines the direction of linear motion of rod 32. Rotation of motor 30 in one direction generates linear motion of rod 32 in a first direction while the opposite rotation of motor 30 generates linear motion of rod 32 in a second direction.

The disclosed gear train confined within transmission assembly 44 provides for a predetermined level of speed reduction of rod 32 relative to the speed of rotation of motor 30. While the preferred embodiments disclose a specific gear train configuration for transmission assembly 44 it is contemplated that any gear train capable of providing the desired speed reduction and torque transmission could be readily utilized.

Motor 30 is provided with a hollow armature shaft (not shown), configured to have a square female receptor 118 adapted to accept a male end 117 extending from cable core end 29a. The second end 63 of drive cable 60 is coupled with male end 117 by inserting both into receptor 118 of motor 30. In this manner, the direction of rotation produced through actuation of motor 30 is transferred to drive cable 60 and cable core 29 simultaneously.

The opposite end 29b of cable core 29 also has a male end 117 which is coupled to slave recliner mechanism 26 and is enclosed in a housing 120. Helical spur gear 62 has a female receptor configured to accept male end 117 of cable end 29b so as to be directly coupled to helical spur gear 62 of transmission assembly 44'. Housing 120 is configured to be identical to the rear-most end of motor 30 so as to have flanges 122 identical to flanges 58 of motor 30. Because of this, the need for specialized or different transmission housing members for the slave recliner mechanism 26 is eliminated.

Figure 2:
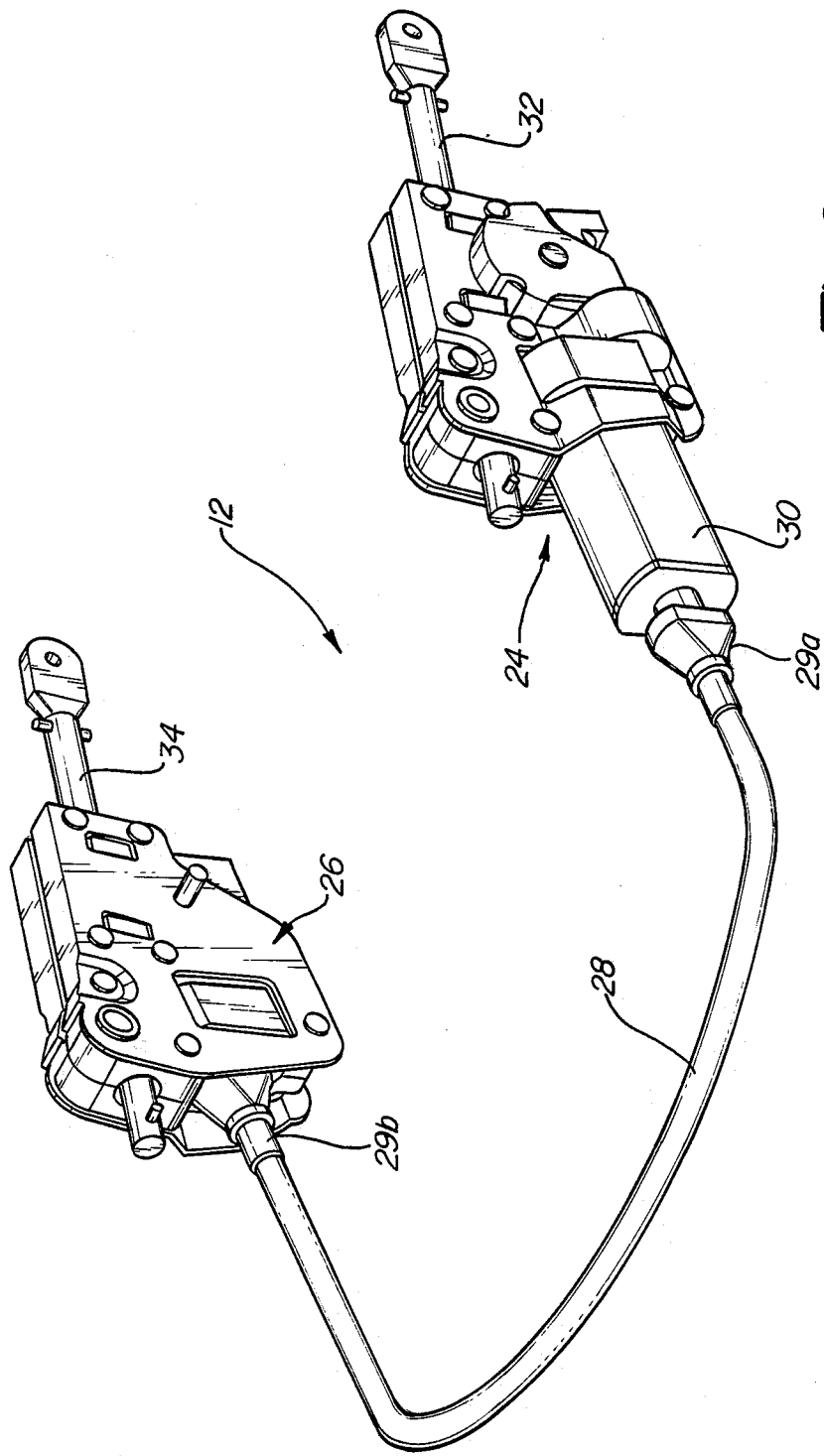
FIG. 2 is a pictorial view of a power linear seat recliner system, shown as an assembly in accordance with the first preferred embodiment of the present invention.
Figure 3:
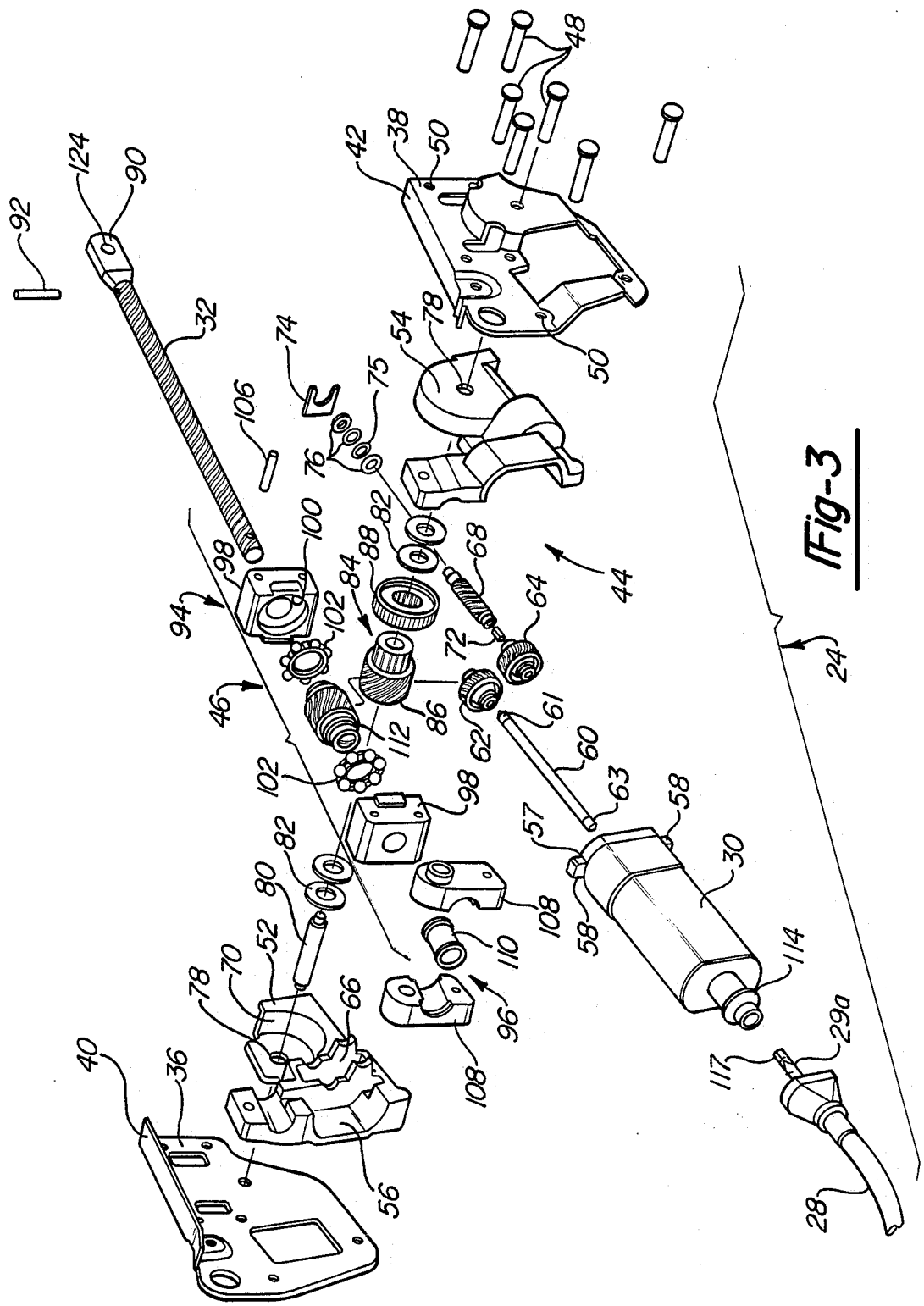
FIG. 3 is an exploded perspective view of the master recliner mechanism shown in FIG. 2.
Figure 7:
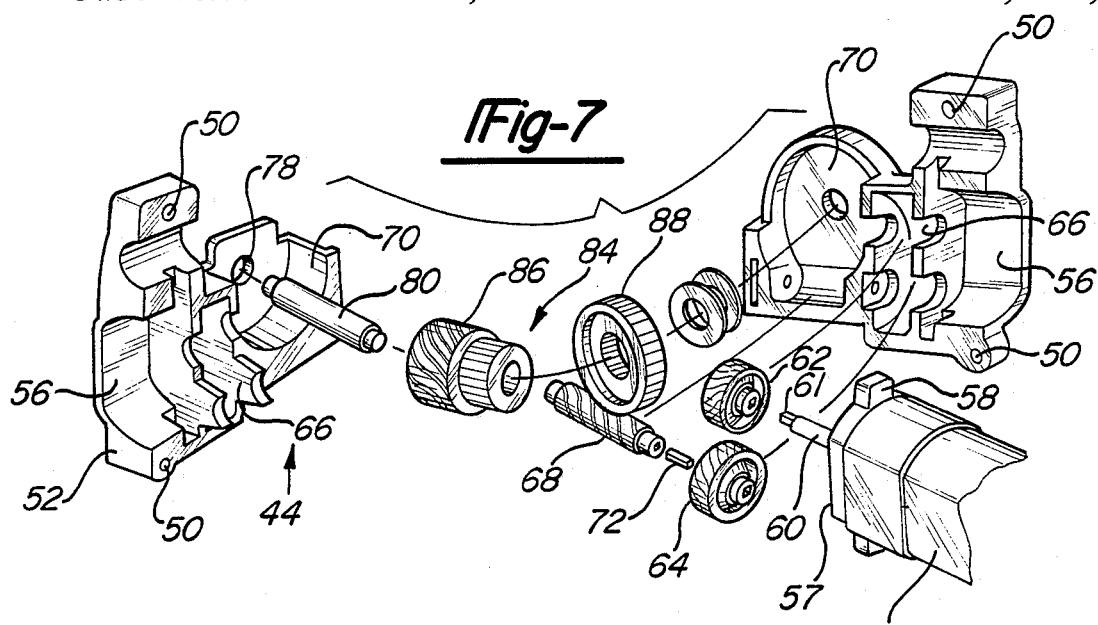
FIG. 7 is an exploded perspective view of the transmission assembly shown in direct operative association with a motor as utilized in the master recliner mechanism shown in FIG. 3.
Figure 8:
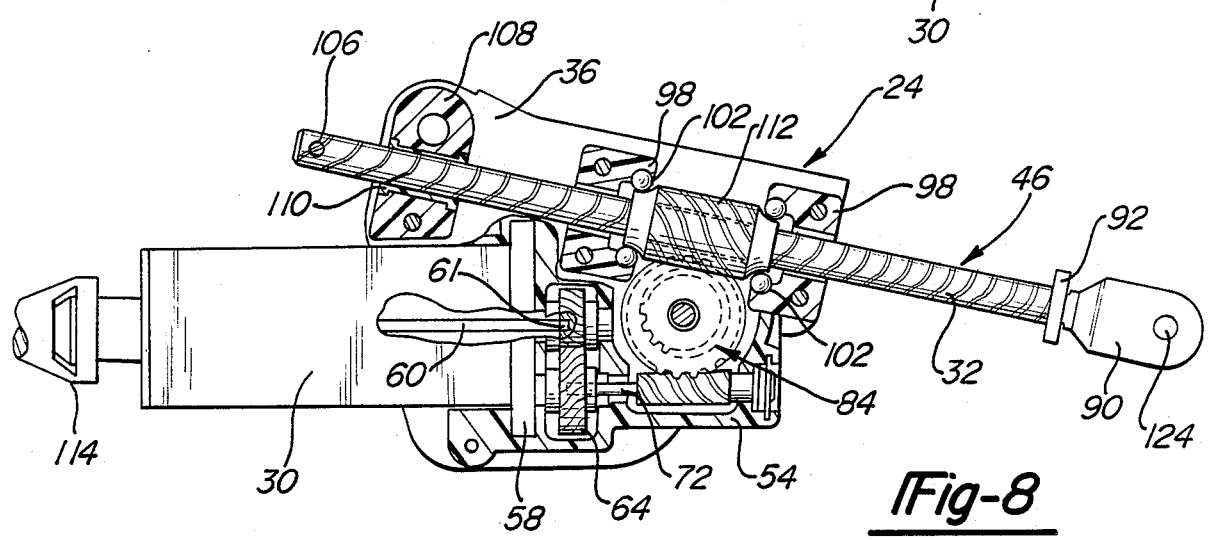
FIG. 8 a side elevational view, partially broken away, illustrating the orientation of the cable with the motor, transmission assembly and rod assembly of the master recliner mechanism.
Figure 9:
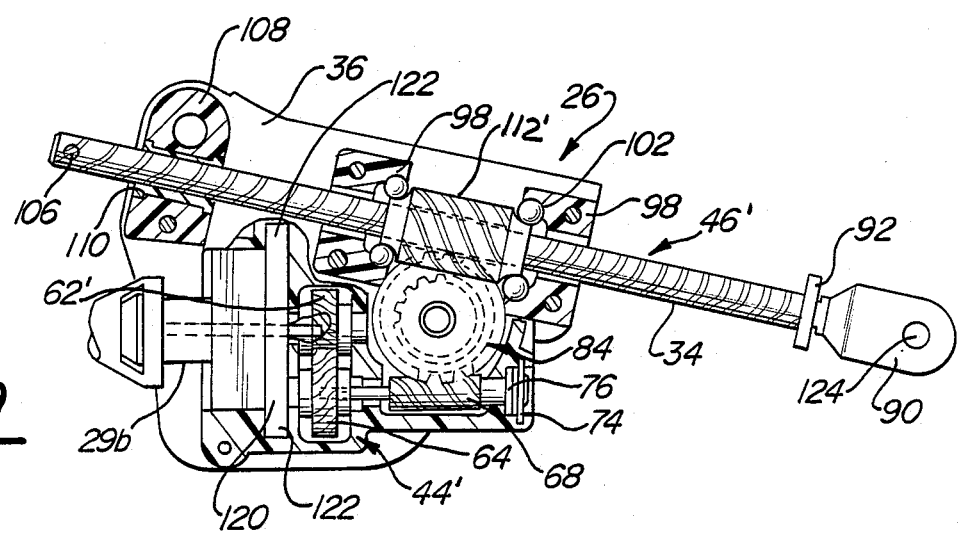
FIG. 9 is a side elevational view, partially broken away, illustrating the orientation of the cable with the transmission assembly and rod assembly of the slave master recliner mechanism.

As is apparent from FIGS. 2, 8 and 9, slave recliner mechanism 26 is comprised of many components (i.e. transmission assembly 44', rod assembly 46'), that are common with, or mirror images of, those of master recliner mechanism 24, except for motor 30, housing 120 and oppositely threaded gear nut 112' and rod 34. The commonality of assembly components provides for reduced cost and the ability to subassemble power linear recliner system 12 as a unit. Additionally, this enables use of an integral motor for directly driving master recliner mechanism 24 while simultaneously providing concurrent actuation of slave recliner mechanism 26 via a single cable 28. While the preferred embodiments disclose side plates and transmission housings for slave recliner mechanism 26 which are a mirror image of those utilized for master recliner mechanism 24, it is contemplated that such components can be universally configured to be common to each recliner mechanism within the fair meaning of the present invention.

In operation, the vehicle operator remotely actuates the motor to rotate the drive cable 60 and cable core 29 in either direction so as to generate the desired seat back adjustment angle. Rotation of direct drive cable 60 and cable core 29 by motor 30 in one direction will provide backward reclining movement of seat back 16 while opposite rotation of motor 30 will provide forward motion of seat back 16. Flat surface 90 provided on the rearward end of threaded rods 32 and 34 has a bore 124 which is securely fastened to lower recliner mechanism 18 via fastener 126. Linear motion of threaded rods 32 and 34 is thereby changed into pivotable motion of seat back 16. It is contemplated that other pivotable connections between threaded rods 32 and 34 and the seat back 16 can be utilized based on the structural configuration of seat assembly 10.

Power linear recliner system 12 permits fine adjustment of seat back 16 relative to seat cushion 14. The speed of tilt-back adjustment is predicated on the gear ratios selected for use in transmission assembly 44. In this light, the system 12 can be designed for each specific vehicle application with relative ease. Preferably, transmission assembly 44 provides a speed reduction while permitting use of a more efficient, smaller motor 30 than typically used in conventional systems. An additional advantage to power linear recliner system 12 is that motor 30 is integrally associated with master recliner mechanism 24. As such, the motor is mounted to structural members of seat assembly 10 instead of centralized mounting of the motor under the seat which is common in conventional linear seat systems.

Figure 10:
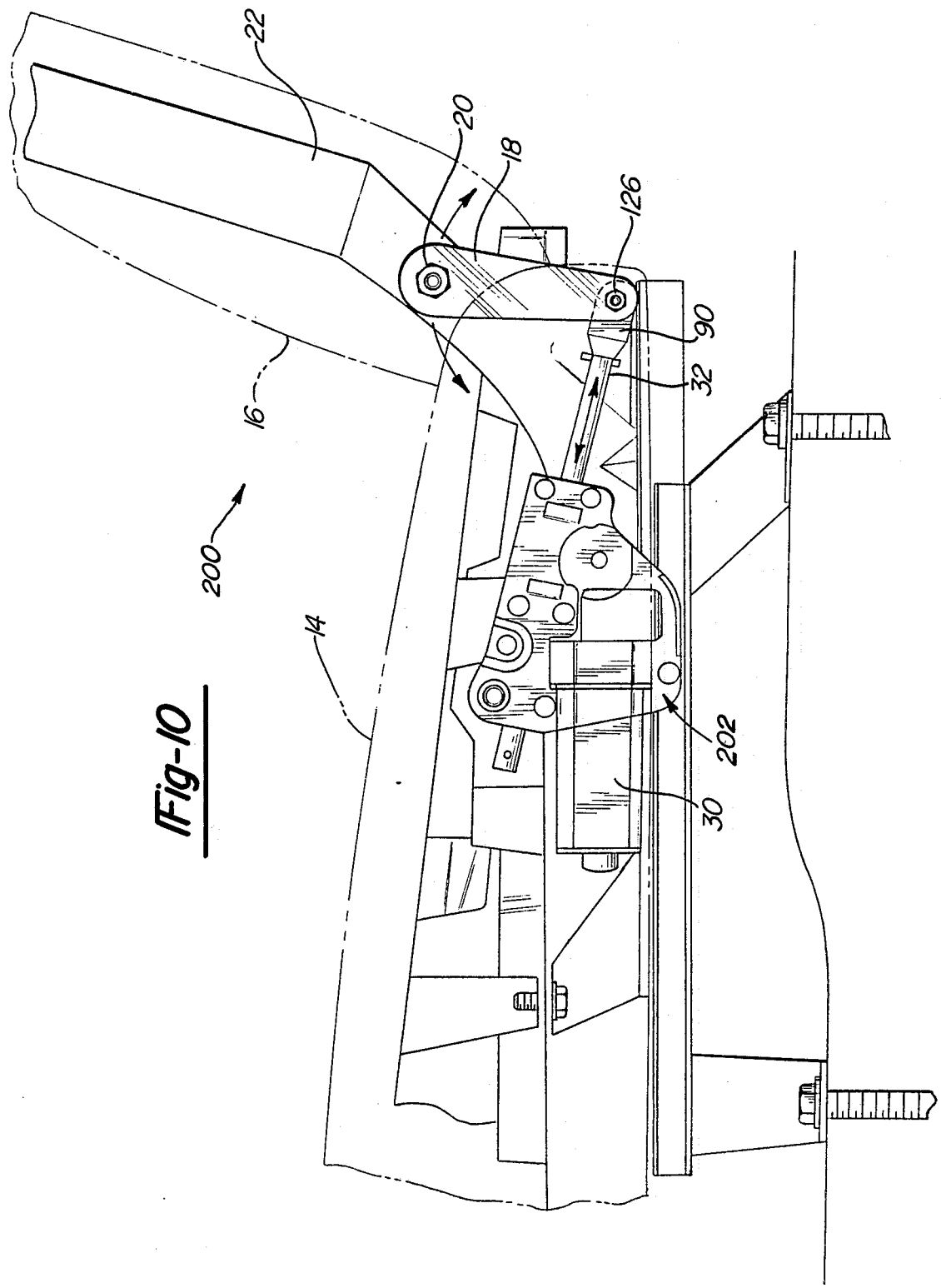
FIG. 10 is a side elevational view of a second preferred embodiment of the present invention.
Figure 11:
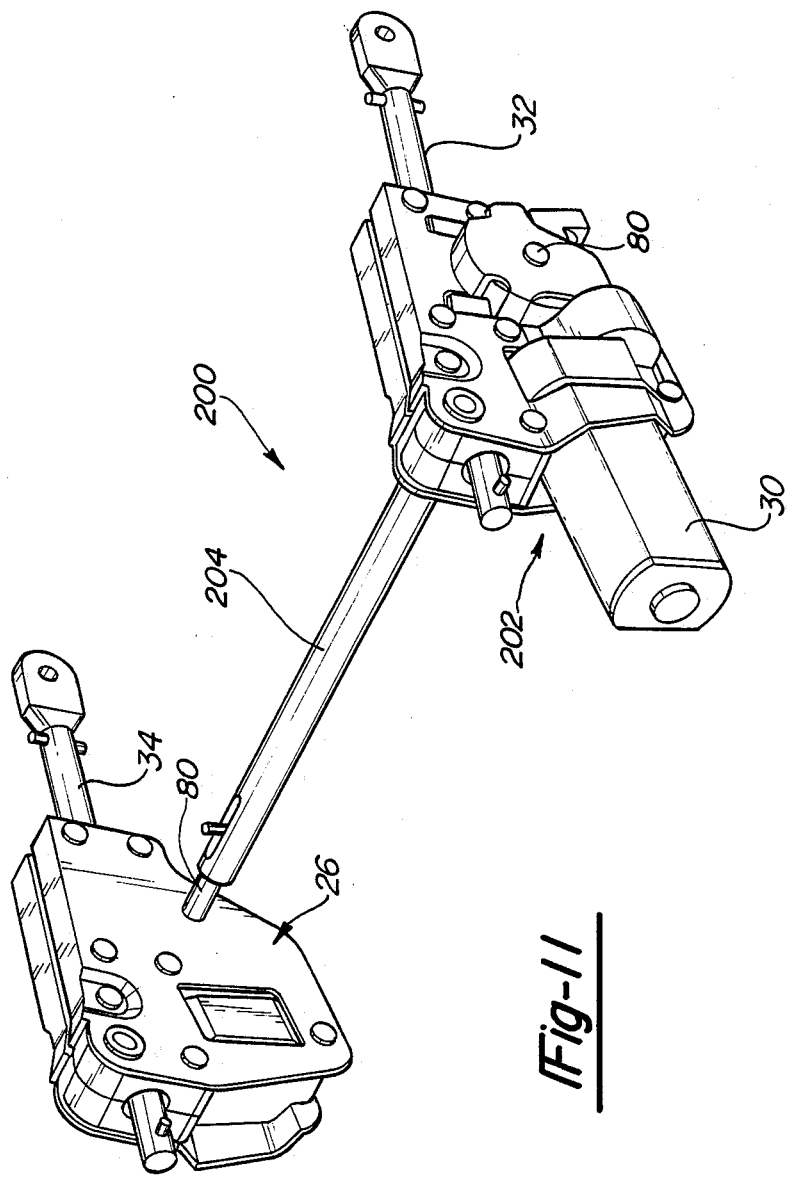
FIG. 11 is a pictorial view of a power linear seat recliner system, shown as an assembly in accordance with the second preferred embodiment.

Referring now to FIGS. 10 and 11, a second preferred embodiment of the present invention is disclosed. The power linear recliner system 200 is provided for adjustably controlling reclining movement of the seat back 16 relative to the seat cushion 14. The power linear recliner system 200 preferably includes a master recliner mechanism 202, a slave recliner mechanism 26, and a torque tube 204 coupled for rotation with shafts 80 of both master recliner mechanism 202 and slave recliner mechanism 26 for transferring torque from the master recliner mechanism 202 to the slave recliner mechanism 26. According to the second preferred embodiment, shafts 80 are rotatably disposed within transmission assemblies 44 and 44'. As previously detailed, actuation of direct drive motor 30, integrally assembled into master recliner mechanism 202, produces simultaneous and substantially identical linear reciprocal motion of threaded rod 32 associated with master recliner mechanism 202 and threaded rod 34 associated with slave recliner mechanism 26. Actuation of the motor 30 is provided by a position control switch (not shown) provided within the passenger compartment and in close proximity to seat assembly 10 to permit the vehicle operator to selectively recline seat back 16 relative to seat cushion 14 in either direction through a range of angular positions. In this manner, the direction of rotation produced through actuation of motor 30 is transferred to drive cable 60 which drives, via the gear train, shaft 80 of master recliner mechanism 202. In turn, shaft 80 of master recliner mechanism 202 drives torque tube 204. Torque tube 204 then, in turn, drives shaft 80 of slave recliner mechanism 26.

As is apparent from the drawings, the second embodiment utilizes many of the components which are identical to those used with the first preferred embodiment.

It is also contemplated that the master recliner mechanism 202 of the second preferred embodiment can be employed without need of a slave recliner mechanism 26 or torque tube 204 in those vehicular seat applications where stable simultaneous lateral inclination is not as critical. Such a condition is contemplated when the recliner support structure for the seat back 16 provides sufficient lateral and angular support such that a one-sided power linear seat recliner system is sufficient. In such a system, the master recliner mechanism 202 would be mounted to one lateral side of the seat support structure for seat cushion 14. Flat surface 90 provided on the rearward end of threaded rod 32 would be fastened to lower recliner structure 18 via fastener 126. As such, linear motion of threaded rod 32 is transformed into pivotable motion of seat back 16 relative to seat cushion 14.

Those skilled in the art can appreciate that other advantages can be obtained from the use of this invention and that modifications can be made without departing from the true spirit of the invention after studying the specification, drawings and following claims.

What is claimed is:

1. A power linear seat recliner apparatus for controllably adjusting the angular position of a seat back relative to a seat, said apparatus being responsive to remote actuation by an operator, comprising:
   a first elongated rod having one end connectable to said seat back;
   a second elongated rod having one end connectable to said seat back, said second rod being positioned parallel to and spaced apart from said first elongated rod;
   a first recliner mechanism connectable to said seat and receiving said first elongated rod, said first recliner mechanism including an integrally mounted motor having a rotatable drive cable axially disposed therein, and first transmission means interconnected to said drive cable for changing the rotational motion of said drive cable generated by actuation of said motor into linear motion of said first elongated rod;

a second recliner mechanism connectable to said seat and receiving said second elongated rod, said second recliner mechanism comprising second transmission means for changing the rotational motion of said drive cable generated by actuation of said motor into linear motion of said second elongated rod; and means connecting said first and second recliner mechanisms for transmitting rotational motion of said drive cable to said second transmission means.

2. A power linear seat recliner apparatus according to claim 1 wherein said first transmission means comprises a first transmission assembly for interconnecting a first end of said drive cable to said first elongated rod, said first transmission assembly controllably reducing the speed of linear motion of said first elongated rod relative to the speed of rotation of said drive cable, and wherein said first elongated rod comprises a threaded rod interconnected with said first transmission assembly so as to generate linear reciprocal motion of said threaded rod upon actuation of said motor.

3. A power linear seat recliner apparatus according to claim 2 wherein said second transmission means comprises a second transmission assembly, said second transmission assembly being a mirror image of said first transmission assembly such that said speed reduction and linear reciprocal movement of said second elongated rod is substantially identical to that of said first elongated rod.

4. A power linear seat recliner apparatus according to claim 3 further comprising a first and second rod assembly associated with said first and second recliner mechanisms, respectively, wherein said first elongated rod is integrally associated with said first rod assembly and said second elongated rod is integrally associated with said second rod assembly, each of said rod assemblies having gear means for interconnecting said elongated rods to its respective transmission assembly.

5. A power linear seat recliner apparatus according to claim 3 wherein said first and second recliner mechanisms are connected to opposite lateral sides of said seat in parallel orientation such that remote actuation by said operator of said motor generates controllable angular change in the position of said seat back relative to said seat.

6. A power linear seat recliner apparatus according to claim 5 wherein rotation of said drive cable in one direction lowers said seat back while rotation of said drive cable in an opposite direction raises said seat back.

7. A power linear seat recliner apparatus according to claim 2 wherein said means connecting said first and second recliner mechanisms comprises an actuator cable having a rotatable inner core member, said core member having one end connectably coupled to a second end of said drive cable and an opposite end connectably coupled to said second transmission means thereby transmitting rotational motion of said drive cable to said second recliner mechanism.

8. A power linear seat recliner apparatus according to claim 2 wherein said means connecting said first and second recliner mechanisms comprises a torque tube connectably coupling said first transmission means to said second transmission means thereby transmitting rotational motion of said drive cable to said second recliner mechanism.

9. A power linear seat recliner apparatus for controllably adjusting the angular position of a slat back relative to a seat, said apparatus being responsive to remote actuation by an operator, comprising:

a master recliner mechanism secured under said seat and having a motor with an axially extending rotatable drive cable, a first rod assembly having a first threaded rod, and a first transmission assembly interconnecting a first end of said drive cable to said first threaded rod, said first transmission assembly interconnected with said first rod assembly such that rotation of said drive cable generates linear movement of said first threaded rod;

an actuator cable having an axially extending core member, one end of said core member coupled to a second end of said drive cable;

a slave recliner mechanism secured under said seat in parallel with said master recliner mechanism comprising a second rod assembly having a second threaded rod, and a second transmission assembly, said second transmission assembly interconnected to a second end of said core member and interconnected to said second threaded rod such that rotation of said drive cable generates linear movement of said second threaded rod; and pivotal support means for connecting an end of said first and second threaded rods to opposite lateral sides of said seat back such that linear movement of said first and second threaded rods produce a corresponding change in the angular position of said seat back relative to said seat.

10. A power linear seat recliner apparatus according to claim 9 wherein said first and second transmission assemblies are substantially identical such that said first and second threaded rods are linearly moveable at a substantially identical rate of motion.

11. A power linear seat recliner apparatus according to claim 10 wherein said first and second transmission assemblies are mirror images of one another.

12. A power linear seat recliner apparatus according to claim 11 wherein said first and second transmission assemblies each comprise a housing including a first recess configured to securably confine said motor in said master recliner mechanism and to confine a cable housing associated with said second end of said cable core member within said slave recliner mechanism.

13. A power linear seat recliner apparatus according to claim 12 wherein said housing includes a second recess configured to intermeshingly receive first and second spur gears, wherein said first spur gear provided in said master recliner mechanism is coupled for rotation with said drive cable and said first spur gear provided in said slave recliner mechanism is coupled for rotation with said second end of said cable core member.

14. A power linear seat recliner apparatus according to claim 13 wherein said housing includes a third recess configured to receive a worm gear, said worm gear meshingly coupled for rotation to said second spur gear in said second recess so as to be rotatably driven thereby, said third recess further including a transversely extending non-rotatable shaft having a splined gear set mounted for rotation thereon, and wherein said splined gear set is intermeshed with said worm gear so as to be rotatably driven thereby.

15. A power linear seat recliner apparatus according to claim 14 wherein said splined gear set includes a third spur gear intermeshed with said worm gear and a fourth spur gear splined to said third spur gear for rotation relative to said shaft.

16. A power linear seat recliner apparatus according to claim 15 wherein said first and second rod assemblies each comprise a gear nut having external and internal threading, each threaded rod intermeshed with said internal threads of its corresponding gear nut for linear reciprocal motion upon rotation of said gear nut, said gear nut engageably intermeshed with said fourth spur gear of said transmission assembly, whereby rotation of said drive cable in a first direction generates substantially simultaneous linear movement of said first and second threaded rods in one direction and rotation of said drive cable in a second direction generates substantially simultaneous linear movement of said first and second threaded rods in an opposite direction so as to angularly adjust said seat back relative to said seat.

17. A seat assembly comprising:
a seat member;
a seat back coupled to said seat member;
pivot means for permitting pivotal movement of said seat back relative to said seat member;
a first elongated rod having one end connectable to said seat back;
a first recliner mechanism connectable to said seat member and receiving said first elongated rod for linearly reciprocable movement therein, said first recliner mechanism including a motor directly mounted thereto and having a rotatable drive cable axially disposed therein, and first transmission means for changing the rotational motion of said drive cable generated by actuation of said motor into linear motion of said first elongated rod, such that actuation of said motor controllably adjusts the angular position of said seat back relative to said seat member;
a second elongated rod having one end connectable to said seat back and positioned parallel to and spaced apart from said first elongaged rod;
a second reclining mechanism connectable to said seat member and receiving said second elongated rod, said second recliner mechanism comprising second transmission means for changing the rotational motion of said drive cable generated by actuation of said motor into linear motion of said second elongated rod; and
means connecting said first and second recliner mechanism for transmitting rotational motion of said drive shaft to said second transmission means.

18. A seat assembly according to claim 17 wherein said first transmission means comprises a first transmission assembly for interconnecting a first end of said drive cable to said first elongated rod, said first transmission assembly controllably reducing the speed of linear motion of said first elongated rod relative to the speed of rotation of said drive cable, and wherein said first elongated rod comprises a threaded rod interconnected with said first transmission assembly so as to generate linear reciprocal motion of said threaded rod upon actuation of said motor.

19. A seat assembly according to claim 18 wherein said second transmission means comprises a second transmission assembly, said second transmission assembly being a mirror image of said first transmission assembly such that the speed reduction and linear reciprocal movement of said second elongated rod is substantially identical to that of said first elongated rod.

20. A seat assembly according to claim 19 wherein said means connecting said first and second recliner mechanisms comprises an actuator cable having a rotatable inner core member, said core member having one end connectably coupled to a second end of said drive cable and an opposite end connectably coupled to said second transmission assembly thereby transmitting rotational motion of said drive cable to said second recliner mechanism.

21. A seat assembly according to claim 19 wherein said means connecting said first and second recliner mechanisms comprises a torque tube connectably coupling said first transmission assembly to said second transmission assembly thereby transmitting rotational motion of said drive cable to said second recliner mechanism.

22. A power linear seat recliner apparatus for controllably adjusting the angular position of a seat back relative to a seat in response to remote actuation by an operator, comprising:
a first recliner mechanism secured to said seat and having a first linearly reciprocable member connected to said seat back, said first recliner mechanism including a directly mounted motor and first transmission means coupled to said motor for selectively generating linear movement of said first linearly reciprocable member upon actuation of said motor so as to adjust the angular position of said seat back relative to said seat;
a second recliner mechanism to said seat and having a second linearly reciprocal member connected to said seat back, said second recliner mechanism comprising second transmission means for generating linear movement of said second linearly reciprocal member; and
actuation means connecting said second transmission means to one of said motor and said first transmission means for generating substantially synchronous linearly reciprocable movement of said first and second linearly reciprocable members.

* * * * *

UNITED STATES PATENT AND TRADEMARK OFFICE
CERTIFICATE OF CORRECTION

PATENT NO. : 4,962,963

DATED : October 16, 1990

INVENTOR(S) : David L. Robinson

It is certified that error appears in the above-identified patent and that said Letters Patent is hereby corrected as shown below:

Column 8, line 4, claim 9, "slat" should be --seat--.

Column 10, line 45, claim 22, after "mechanism", insert --secured--.

Signed and Sealed this

Seventh Day of April, 1992

*Attest:*

HARRY F. MANBECK, JR.

*Attesting Officer*      *Commissioner of Patents and Trademarks*